(12) United States Patent
Thomas et al.

(10) Patent No.: US 11,402,166 B2
(45) Date of Patent: Aug. 2, 2022

(54) SYSTEM AND METHOD FOR WIRELESSLY COMMUNICATING CONTAINER CONTENT LEVELS AND STORAGE CAPACITY

(71) Applicant: The United States of America as represented by the Secretary of the Navy, San Diego, CA (US)

(72) Inventors: Robert Whitfield Thomas, Moncks Corner, SC (US); John Sheldon Haynes, Goose Creek, SC (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 7 days.

(21) Appl. No.: 17/130,245

(22) Filed: Dec. 22, 2020

(65) Prior Publication Data

US 2022/0196356 A1    Jun. 23, 2022

(51) Int. Cl.
*F41A 9/62* (2006.01)
*G06K 7/10* (2006.01)

(52) U.S. Cl.
CPC ............ *F41A 9/62* (2013.01); *G06K 7/10366* (2013.01)

(58) Field of Classification Search
CPC .............................. F41A 9/62; G06K 7/10366
USPC ........................................ 42/1.01, 1.02, 1.03
See application file for complete search history.

(56) References Cited

U.S. PATENT DOCUMENTS

| | | | |
|---|---|---|---|
| 5,826,360 A * | 10/1998 | Herold | F41A 9/62 42/1.02 |
| 2008/0273684 A1 * | 11/2008 | Profanchik | G08B 13/2417 379/207.02 |
| 2010/0281725 A1 * | 11/2010 | Arbouw | F41A 9/62 342/357.51 |
| 2012/0245969 A1 * | 9/2012 | Campbell | G06Q 10/087 705/7.11 |
| 2015/0102911 A1 * | 4/2015 | Haruta | G06K 7/10405 340/10.1 |
| 2017/0336160 A1 * | 11/2017 | Walther | F41A 9/62 |
| 2019/0277590 A1 * | 9/2019 | Masarik | F41A 9/70 |
| 2020/0080807 A1 * | 3/2020 | Flood | F41A 9/62 |
| 2021/0116288 A1 * | 4/2021 | Rego de Oliveira | G06K 7/10366 |

\* cited by examiner

*Primary Examiner* — Bret Hayes
(74) *Attorney, Agent, or Firm* — Naval Information Warfare Center, Pacific; Kyle Eppele; Evan Hastings

(57) ABSTRACT

The system and method taught herein allow a user to quickly determine how much inventory of a particular type is stored in nearby containers. Rather than inspect each container individually, a user need only scan the area for nearby containers. Each container will respond with its unique identifier and the number of items it contains.

14 Claims, 3 Drawing Sheets

SYSTEM AND METHOD FOR WIRELESSLY COMMUNICATING CONTAINER CONTENT LEVELS AND STORAGE CAPACITY

FEDERALLY-SPONSORED RESEARCH AND DEVELOPMENT

The System and Method for Wirelessly Communicating Container Content Levels and Storage Capacity is assigned to the United States Government and is available for licensing for commercial purposes. Licensing and technical inquiries may be directed to the Office of Research and Technical Applications, Naval Information Warfare Center, Atlantic, Code 70F00, North Charleston, S.C., 29419-9022; voice (843) 218-3495; email ssc_lant_T2@navy.mil; reference Navy Case Number 111926.

BACKGROUND

Users taking inventory of items stored in containers have to check each individual container to determine total available counts. This can be tedious, especially when containers have been opened or are partially filled. Containers exist today that report fill levels on read outs, saving a user from opening the container, however each container must be scanned directly. Current inventory systems track the number of containers present but not individual contents. A need exists for a method that allows a user to quickly determine how much inventory of a particular items is stored in nearby containers. In a proposed system and method described herein, rather than inspect each container individually, the user need only scan a desired area for nearby containers. Each container will respond with its unique identifier and the number of items it contains.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

Figure 1:
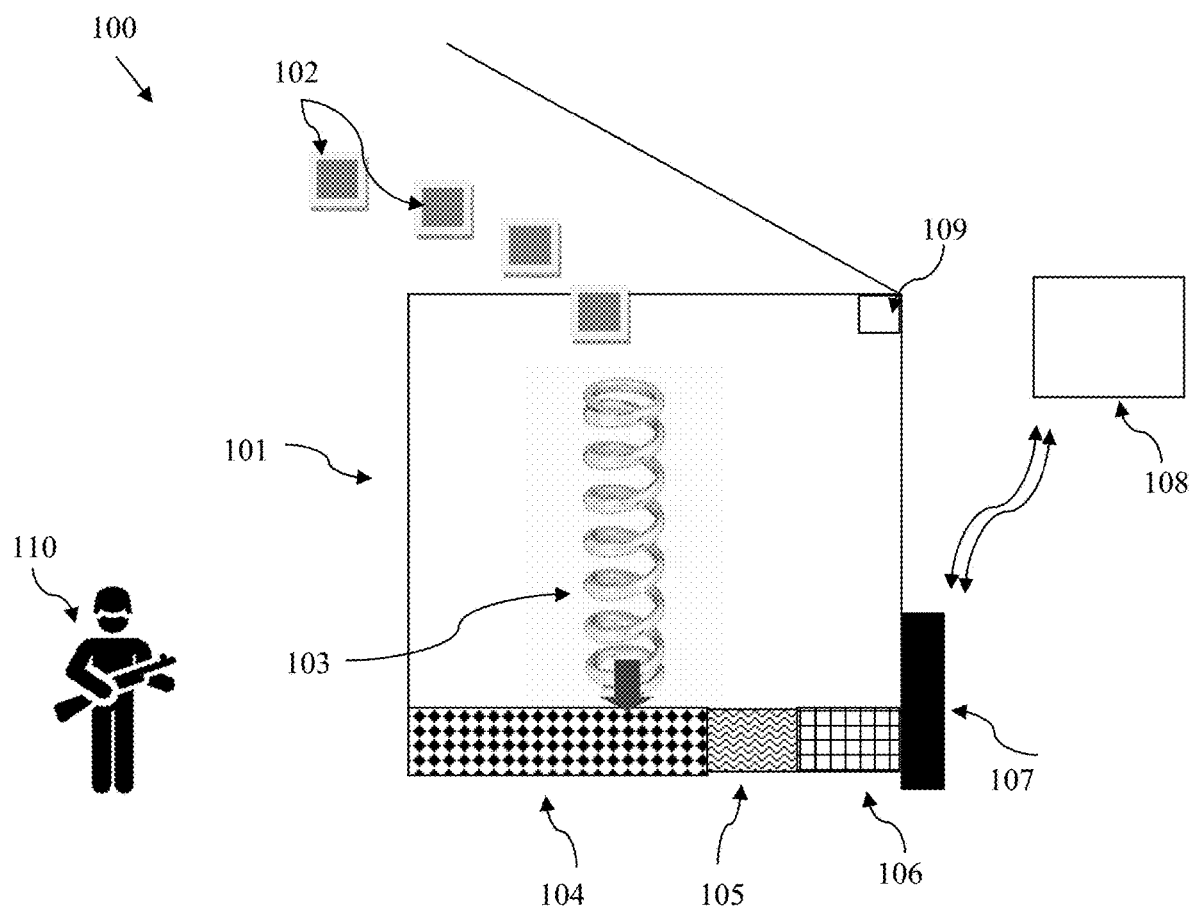
FIG. 1 shows an embodiment of a wirelessly-communicating container system.

FIG. 1 shows an embodiment of a wirelessly-communicating container system 100. A spring-loaded container 101 can hold a plurality of objects 102 of uniform size and weight. As objects 102 are loaded, a spring 103 is compressed creating force against a baseplate 104. This force is measured by a load cell 105 which provides input to a Wheatstone Bridge 106. Wheatstone Bridge 106 provides an analog signal to a micro-controller 107 based on load cell 105 inputs. Micro-controller 107 digitizes the Wheatstone inputs and converts those inputs into an integer value for the number of objects 102 loaded into spring-loaded container 101. Micro-107 is wirelessly connected to a wireless transmitter 108 such as an RFID integrated chip. When a valid read request is received via the wireless connection, micro-controller 107 responds with its unique ID, the count of objects 102, and whether or not spring-loaded container 101 is currently an item of focus (e.g. a magazine in a rifle, or the next container in queue to be shipped). An on/off switch 109 is used to save power and avoid transmitting for any desired reason. A user unit 110 can query other containers in range wirelessly. User unit 110 then sums up the inventory counts by total inventory and inventory of containers in focus and displays to user unit 110.

Figure 2:
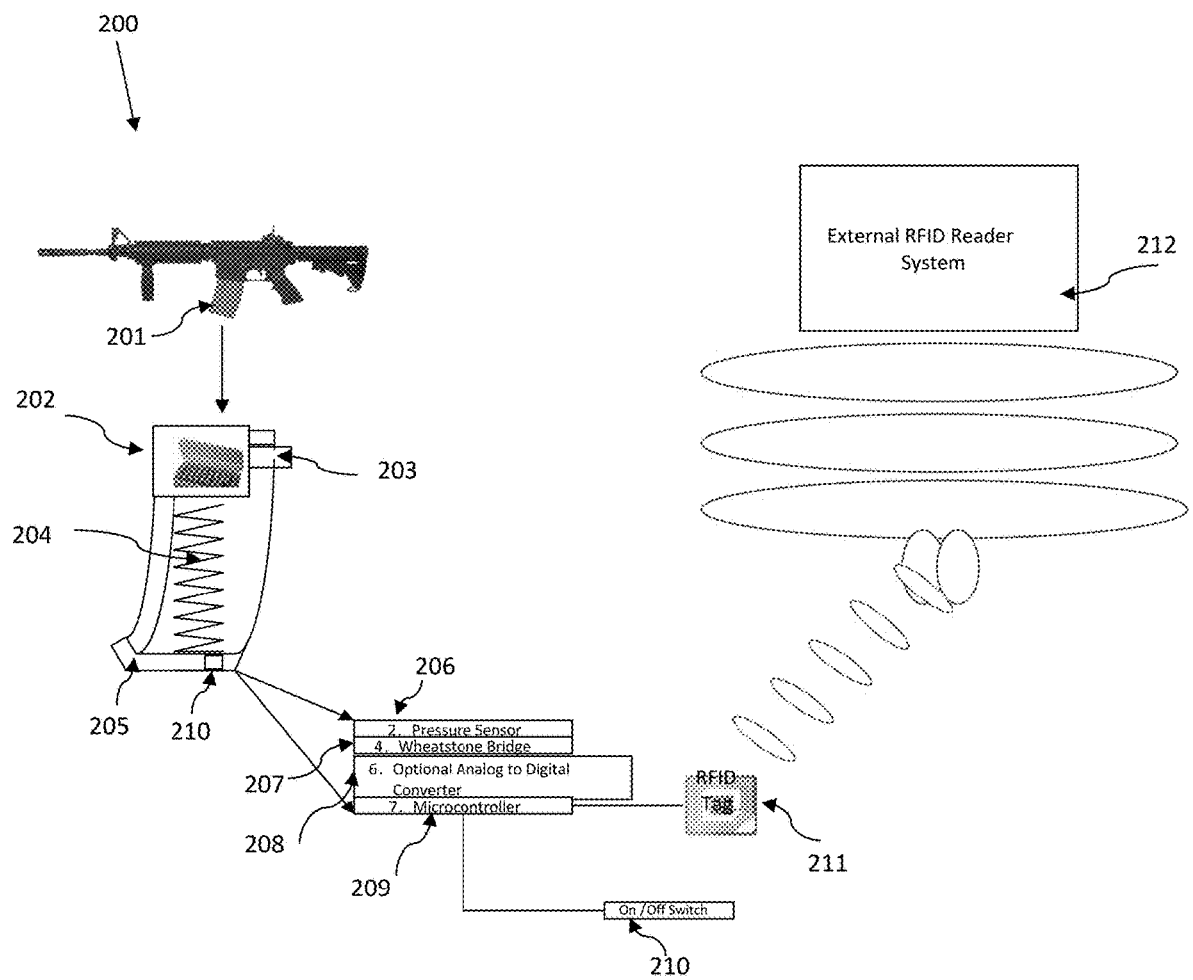
FIG. 2 shows a method for wirelessly communicating container content levels and storage capacity.

FIG. 2 shows an alternate embodiment of a wirelessly-communicating container system 200. Here, the container is a spring-loaded custom weapon magazine 201 capable of holding ammunition 202 of uniform size and weight. Magazine 201 comprises multiple components. First, magazine 201 comprises a focus switch 203. Focus switch 203 can be set to an ON position or OFF position and is set to ON when magazine 201 is loaded into a weapon. As ammunition 202 is loaded into magazine 201, a spring 204 located inside magazine 201 is compressed creating force against a baseplate 205. Baseplate 205 is located at the base of magazine 201 and comprises a pressure sensor 206, a Wheatstone Bridge 207, an analog-to-digital converter 208, a micro-controller 209, and an on-off switch 210. Pressure sensor 206 detects the force on spring 204 which is indicated by means of Wheatstone Bridge 207. Wheatstone Bridge 207 is used to measure the resistance produced by pressure sensor 206 as a result of the force exerted by spring 204. The change in force exerted by spring 204 affects the conductive properties of pressure sensor 206, adding or removing electrical resistance. The change in resistance at pressure sensor 206 is reflected in the amount of analog voltage that passes through Wheatstone Bridge 207. A quarter, half, or full Wheatstone Bridge may be used.

The analog voltage passes through Wheatstone Bridge 207. An optional analog-to-digital converter 208 sends a digital signal to a micro-controller 209 based on its reading from pressure sensor 206. If optional analog-to-digital converter 208 is not needed due to a high sensitivity micro-controller or one that has its own internal amplification capability, micro-controller 209 can digitally convert the digital voltage to an integer value representing the number of rounds of ammunition 202 in magazine 201 based on calibration values. Magazine 201 has an on/off power switch 210 to save power or avoid transmitting for any desired reason.

Micro-controller 209 is electrically connected to a wireless transmitter 211, such as via an RFID tag. A user can make a request to wireless transmitter 211 via a wireless connection to obtain details about the contents of magazine 201. The request is sent from wireless transmitter 211 to micro-controller 209. Micro-controller 209 responds with its unique ID, the count of ammunition 202, and whether or not container 200 is currently an item of focus (e.g. a magazine in a rifle, or the next container in queue to be shipped). The response from micro-controller 209 is transmitted out by wireless transmitter 211 for the user to receive. The user queries containers in range wirelessly and receives responses via an external reader system 212. External reader system 212 then sums up the inventory counts by total inventory and by inventory of containers in focus and displays both values to the user. The position of power switch 210 dictates whether the device will activate when an encoded signal is received from an external reader. Beyond preventing activation, power switch 210 may also disconnect internal power sources if present.

The integrated chip that performs wireless communications could vary based on desired protocol and frequency. The container could have a lid causing the compression force on the spring(s) to be based on the volume displaced by the contents vice weight.

Figure 3:
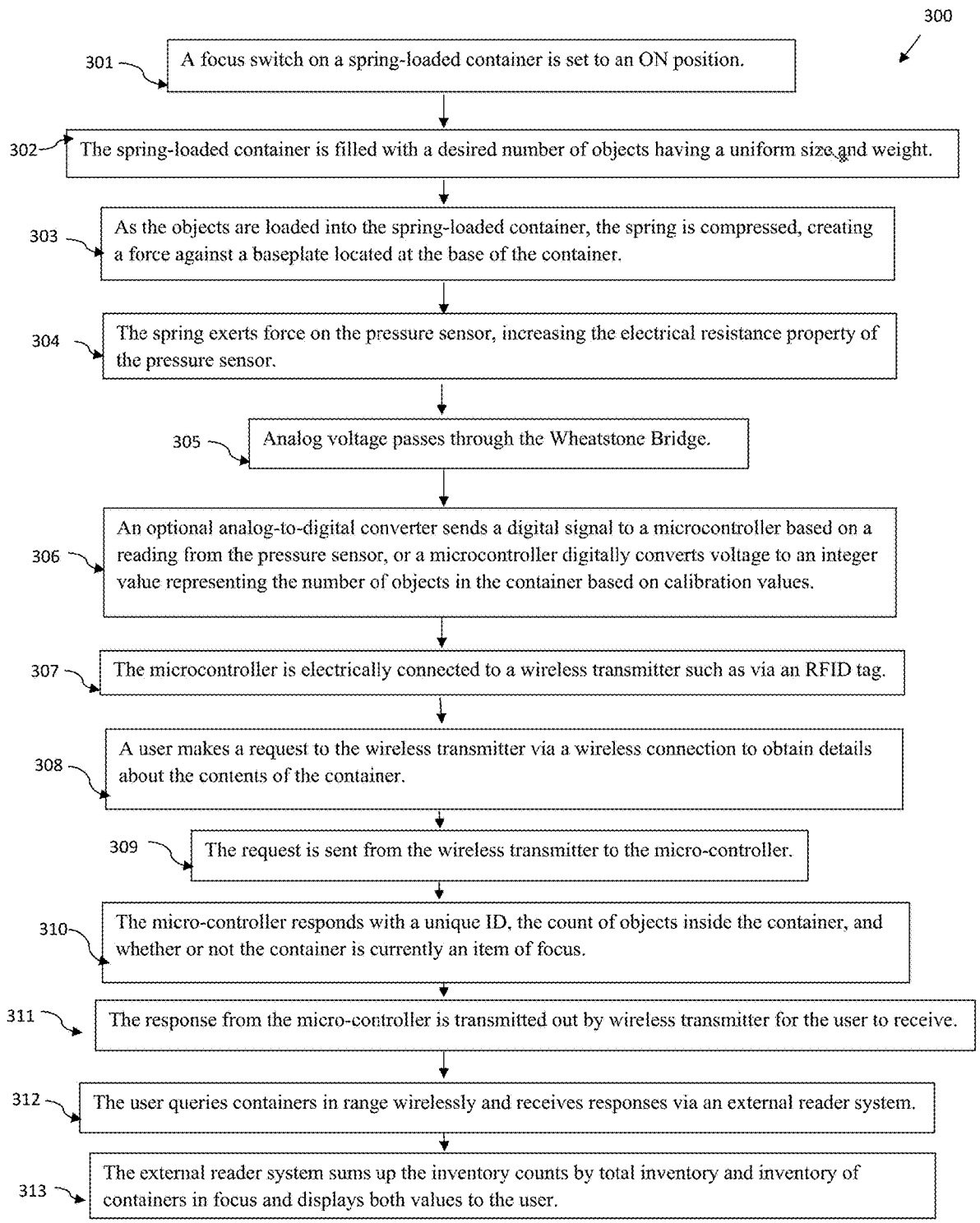
FIG. 3 shows a flow chart demonstrating a method for wirelessly communicating container content levels and storage capacity.

FIG. 3 shows a flow chart 300 demonstrating a method for wirelessly communicating container content levels and storage capacity. In step 301, a focus switch on a container is set to an ON position indicating objects having a uniform size and weight are about to be loaded into a spring-loaded container. In step 302, the spring-loaded container is filled with a desired amount of objects having a uniform size and weight. In step 303, as the objects are loaded into the spring-loaded container, the spring is compressed, creating a force against a baseplate located at the base of the container. The baseplate comprises a pressure sensor, a Wheatstone bridge, a micro-controller, and an on-off switch. The baseplate may contain an optional analog-to-digital converter. In step 304, the spring exerts force on the pressure sensor, increasing the electrical resistance property of the pressure sensor. The change in resistance at the pressure sensor is reflected in the amount of analog voltage that passes through the Wheatstone Bridge. The Wheatstone Bridge is used to measure the resistance produced by the pressure sensor as a result of the force exerted by the spring. A quarter, half, or full Wheatstone Bridge may be used.

In step 305, analog voltage passes through the Wheatstone Bridge. An optional analog-to-digital converter sends aa digital signal to the micro-controller based on its reading from the pressure sensor. If the optional analog-to-digital converter is not needed due to a high sensitivity micro-controller or one that has its own internal amplification capability, in step 306, a micro-controller can digitally convert the voltage to an integer value representing the number of objects in the container based on calibration values. The container has an on/off power switch to save power or avoid transmitting for any desired reason.

In step 307, the micro-controller is electrically connected to a wireless transmitter such as via an RFID tag. In step 308, a user can make a request to the wireless transmitter via a wireless connection to obtain details about the contents of the container. In step 309, the request is sent from the wireless transmitter to the micro-controller. In step 310, the micro-controller responds with a unique ID, the count of objects inside the container, and whether or not the container is currently an item of focus (e.g. a magazine in a rifle, or the next container in queue to be shipped). In step 311, the response from the micro-controller is transmitted out by wireless transmitter for the user to receive. In step 312, the user queries containers in range wirelessly and receives responses via an external reader system. In step 313, the external reader system then sums up the inventory counts by total inventory and by inventory of containers in focus and displays both values to the user.

The container has a power switch that dictates whether the device will activate when an encoded signal is received from an external reader. Beyond preventing activation, the power switch may also disconnect internal power sources if present. The integrated chip that performs wireless communications could vary based on desired protocol and frequency. The container could have a lid causing the compression force on the spring(s) to be based on the volume displaced by the contents vice weight.

Many modifications and variations of the System and Method for wirelessly communicating container content levels and storage capacity are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A system for wirelessly communicating container content levels comprising:
   a container configured to hold a plurality of objects having a uniform size and weight, wherein the container comprises a spring that is compressed upon placement of the objects into the container creating a measurable force on the spring;
   a baseplate mechanically coupled to a base of the container, wherein the baseplate comprises a pressure sensor, a Wheatstone bridge, a micro-controller, and an on/off-switch, the pressure sensor configured to measure the force on the spring, the Wheatstone bridge configured to measure resistance produced by the pressure sensor and subsequently send a digital signal to the micro-controller indicating voltage, the micro-controller configured to convert the voltage to an integer value that represents the number of objects placed in the container;
   a wireless transmitter electrically connected to the micro-controller, wherein the wireless transmitter is configured to allow a user to obtain details about the contents of the container.

2. The system of claim 1, further comprising:
   an analog-to-digital converter electrically coupled to the baseplate, wherein the analog-to-digital converter is configured to read the pressure sensor and send a digital signal to the micro-controller indicating voltage.

3. The system of claim 2, wherein the wireless transmitter is electrically connected to the micro-controller via an RFID tag.

4. The system of claim 3, wherein the container further comprises a focus switch having an ON position and OFF position, and is set to the ON position when one or more objects are loaded into the container.

5. The system of claim 4 further comprising an external reader system configured to communicate wirelessly with the wireless transmitter, and wherein the external reader system sums up the inventory counts by total inventory of objects and total inventory of containers in focus and displays both values to a user.

6. The system of claim 1, wherein the container is a weapon magazine and the plurality of objects to be placed inside the container is ammunition.

7. A method for wirelessly communicating container content levels comprising:
loading a desired number of objects having a uniform size and weight into a spring-loaded container, the container having a focus switch that is set to the "ON" position;
compressing the spring with the loaded objects and creating a force that is transferred to a pressure sensor in the form of electrical resistance, wherein the pressure sensor is electrically connected to a Wheatstone bridge;
passing analog voltage passes through the Wheatstone Bridge;
using a micro-controller to digitally convert the voltage to an integer value representing the number of objects in the container;
electrically connecting the micro-controller to a wireless transmitter via an RFID tag;
making a request to the wireless transmitter via a wireless connection to obtain details about the contents of the container;
sending the request from the wireless transmitter to the micro-controller, the micro-controller responding with a unique ID, the count of objects inside the container, and whether the container is currently an item of focus;
transmitting a response from the micro-controller via a wireless transmitter to a user.

8. The method of claim 7, further comprising the steps of:
querying containers in range wirelessly receiving responses via an external reader system;
using the external reader system to sum up the inventory counts by total inventory and by inventory of containers in focus and displaying both values to the user.

9. The method of claim 7 further comprising the steps of:
loading a desired amount of ammunition into a spring-loaded weapon magazine.

10. A system for wirelessly communicating container content levels comprising:
a spring-loaded container configured to hold a plurality of objects of uniform size and weight;
a spring configured to be compressed by the plurality of objects, the spring creating force against a baseplate;
a load cell configured to measure the force;
a Wheatstone bridge configured to receive input from the load cell on force measurement;
a micro-controller configured to receive input from the Wheatstone Bridge, the micro-controller configured to convert the input into an integer value specifying the number of objects placed into the container.

11. The system of claim 10, further comprising a wireless transmitter electrically connected to the micro-controller, wherein the wireless transmitter is configured to send a request to the micro-controller for a count of current inventory of objects and whether the container is a current item of focus.

12. The system of claim 11, further comprising an on/off switch configured to save power and avoid transmitting without a request.

13. The system of claim 12, further comprising an external reader system configured to the sum up the inventory counts by total inventory and by inventory of containers in focus and displays both values to a user.

14. The system of claim 10 wherein the spring-loaded container is a weapon magazine and wherein the plurality of objects comprises magazine ammunition.

* * * * *